United States Patent Office.

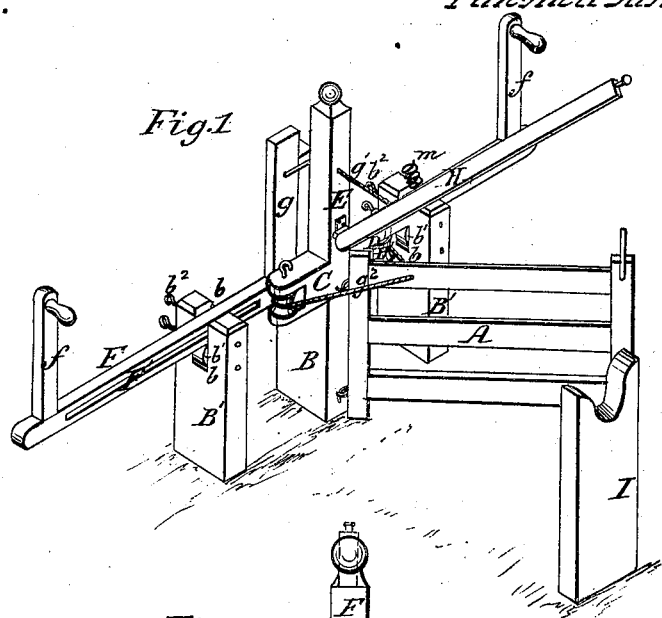
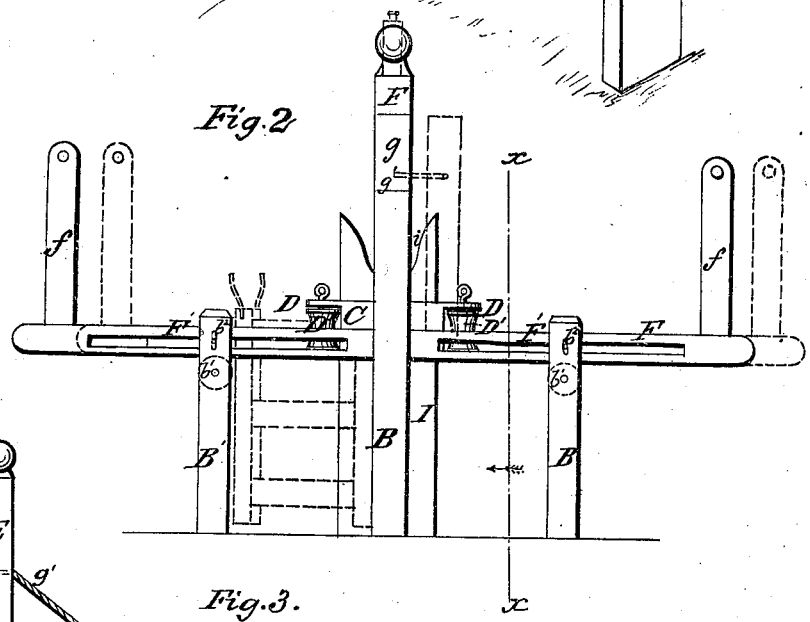
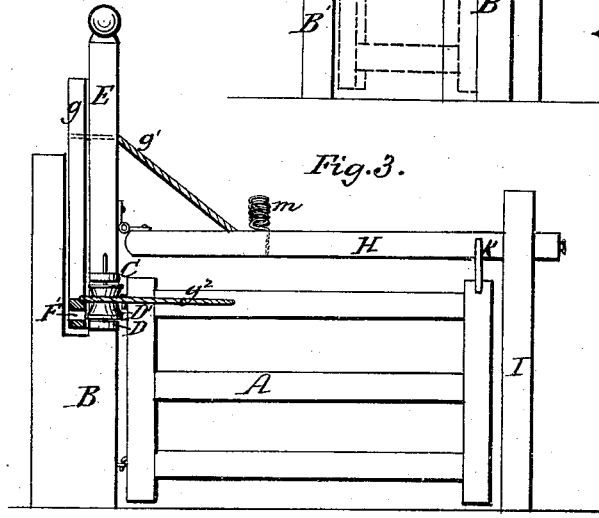

MICHAEL NEUDGENT, OF HARTLAND, MICHIGAN.

Letters Patent No. 85,755, dated January 12, 1869.

IMPROVEMENT IN GATES.

The Schedule referred to in these Letters Patent and making part of the same

*To all whom it may concern:*

Be it known that I, MICHAEL NEUDGENT, of Hartland, in the county of Livingston, and State of Michigan, have invented certain new and useful Improvements in Gates; and I do hereby declare that the following is a full, clear, and exact description of the same, reference being had to the accompanying drawings, making a part of this specification, in which—

Figure 1 is a perspective view.
Figure 2 is a rear elevation.
Figure 3 is a sectional elevation, on line $xx$ of fig. 2.
Figure 4 is a detached view of the front and batten of gate.

The nature of my invention relates to the mechanism employed in opening and shutting gates, the construction and operation of which are as follows:

A is a gate, of any suitable construction, hinged to a main post, B, and swinging right and left.

B′ B′ are posts on each side of and a short distance from the main post B.

$bb$ are vertical slots in the tops of the posts B′ B′, within which are journalled the rollers $b^1 b^1$.

C is a cross-piece, resting on a step, about midway the height of the main post B, having in each end a slot, D, within which are journalled the pulley-rollers D′ D′.

E is an upright or standard in the centre of the cross-piece C.

F is a horizontal bar moving over the rollers $b^1 b^1$, within the slots $bb$, and behind the cross-piece C, with slots F′ F′, through which pins $b^2 b^2$ in the posts B′ B′ pass, to keep the bar from rising.

$ff$ are handles at each end, by which said bar F is moved.

$g$ is a standard in the centre of the bar F, to the top of which is attached a rope or chain, $g^1$, which passes through a hole in the upright, E, and is connected with a bar, H, hinged, to swing up and down, to the front of the upright, E.

$g^2$ is a rope or chain attached to the lower end of the standard $g$, or to the bar F at that point, and, passing around the rollers D′ D′, is connected with the gate.

I is the front post of gate.

$i$, a slot in the top thereof for receiving the end of the bar H.

K K are pieces of bent iron, or equivalent, arranged as shown in fig. 4, to receive the bar H and retain it in position, to prevent the gate being opened except when the bar H is raised.

$m$ is a spring, spiral or other, attached to the top of the bar H, so that it shall fall whenever it is desired.

It will be seen that when the bar F is moved in either direction, the gate is either opened or shut, the bar H being raised by the rope or chain $g^1$, as shown in the drawings.

What I claim as my invention, and desire to secure by Letters Patent, is—

1. The bar F, rope or chain $g^2$, pulley-rollers D′ D′, in combination with the gate A, as and for the purpose substantially as set forth.

2. The combination of the bar F, rope or chain $g^1$, and bar H and device K K, substantially as and for the described purpose.

3. In combination with the bar F and posts B′, the rollers $b^1 b^1$ and bolts $b^2 b^2$, substantially as and for the purpose specified.

4. The combination of the above claims.

MICHAEL NEUDGENT.

Witnesses:
   THOS. A. CONNOLLY,
   EDW. P. MASI.